United States Patent
Fujieda et al.

(10) Patent No.: US 8,282,373 B2
(45) Date of Patent: Oct. 9, 2012

(54) TIRE VULCANIZER

(75) Inventors: Yasuhiko Fujieda, Takasago (JP);
Masaharu Shibata, Takasago (JP)

(73) Assignee: Kobe Steel, Ltd., Kobe-shi (JP)

( * ) Notice: Subject to any disclaimer, the term of this patent is extended or adjusted under 35 U.S.C. 154(b) by 0 days.

(21) Appl. No.: 13/014,232

(22) Filed: Jan. 26, 2011

(65) Prior Publication Data
US 2011/0200698 A1 Aug. 18, 2011

(30) Foreign Application Priority Data

Feb. 18, 2010 (JP) ................................ 2010-033390

(51) Int. Cl.
*B29C 35/02* (2006.01)
*B29C 33/22* (2006.01)

(52) U.S. Cl. ........................................................ 425/47
(58) Field of Classification Search .................. 425/47
See application file for complete search history.

(56) References Cited

U.S. PATENT DOCUMENTS

| | | | | |
|---|---|---|---|---|
| 3,936,251 A | * | 2/1976 | Billey | 425/38 |
| 4,105,379 A | | 8/1978 | Gazuit | |
| 4,245,971 A | * | 1/1981 | MacMillan | 425/47 |
| 4,318,682 A | * | 3/1982 | Larson et al. | 425/47 |
| 4,453,902 A | | 6/1984 | Imbert | |
| 4,533,304 A | | 8/1985 | Amano et al. | |
| 4,548,564 A | | 10/1985 | Nixon et al. | |
| 4,804,318 A | * | 2/1989 | Fujieda et al. | 425/47 |
| 5,194,267 A | * | 3/1993 | Funakoshi et al. | 425/47 |
| 5,238,394 A | | 8/1993 | Hirata | |
| 5,744,169 A | | 4/1998 | Fujieda et al. | |

(Continued)

FOREIGN PATENT DOCUMENTS

DE 1938905 11/1971

(Continued)

OTHER PUBLICATIONS

Extended Search Report issued Aug. 3, 2011 in Europe Application No. 11151960.9.

*Primary Examiner* — James Mackey
(74) *Attorney, Agent, or Firm* — Oblon, Spivak, McClelland, Maier & Neustadt, L.L.P.

(57) ABSTRACT

In a tire vulcanizer of the present invention, a locking mechanism which secures a top mold and a bottom mold in a closed condition comprises tie rods disposed alongside the top mold, and each having a top end part fixed to a top mold mounting member and a lower end part on which a plurality of grooves are formed one above the other in a vertical direction; through holes formed in a bottom mold mounting member for allowing each of the tie rod to pass through each of the through holes; lock plates capable of engaging and disengaging, along a horizontal direction, with the groove on each tie rod having passed through each through hole, and lock plate shifting mechanisms each opening and closing the lock plates only in a horizontal direction relative to each tie rod. With the configuration as described above, adjustment based on a height of a mold is simplified, while reducing an overall height of the tire vulcanizer.

5 Claims, 5 Drawing Sheets

| U.S. PATENT DOCUMENTS | | | | | FOREIGN PATENT DOCUMENTS | | |
|---|---|---|---|---|---|---|---|
| 5,866,170 | A * | 2/1999 | Fujieda et al. | 425/47 | DE | 198 17 822 A1 | 10/1999 |
| 6,908,584 | B2 * | 6/2005 | Cole | 425/47 | JP | 1-24048 | 5/1989 |
| 2002/0086088 | A1 | 7/2002 | Romi | | JP | 1-45403 | 10/1989 |
| 2004/0032057 | A1 | 2/2004 | Cole | | JP | 3-70610 | 11/1991 |
| 2005/0136145 | A1 | 6/2005 | Cole | | | | |
| 2006/0131786 | A1 | 6/2006 | Cole | | | | |
| 2006/0267248 | A1 | 11/2006 | Cole | | | | |

* cited by examiner

CENTER OF CIRCLES OF RAW TIRE AND PISTON MEMBER

TIRE VULCANIZER

BACKGROUND OF THE INVENTION

1. Field of the Invention

The present invention relates to a tire vulcanizer. More particularly, the present invention relates to a tire vulcanizer in which a distance between top and bottom mold mounting members can be adjusted based on a height of a mold.

2. Description of the Related Art

A tire vulcanizer is a machine in which an unvulcanized raw tire (a green tire) received in a mold is vulcanized and patterned by applying heat from both inside and outside the mold. In general, a mold of the tire vulcanizer comprises a two-part mold which is divided into two, top and bottom, parts. A top mold and a bottom mold of the two-part mold are respectively retained by a top mold mounting member and a bottom mold mounting member. Then, opening and closing of the mold can be achieved by moving up and down the top mold mounting member along a vertical direction relative to the bottom mold mounting member.

Here, when the mold is replaced in order to vulcanize a different type/size of the raw tire in the tire vulcanizer, the height (thickness) of the mold may be changed. As a result of such a change in height of the mold, it becomes necessary to adjust the distance between the top and bottom mold mounting members, or other features based on the height of the mold. For this reason, various adjustment methods have been conventionally suggested.

For example, a tire vulcanizer described in JP Kokoku (Examined Patent Publication) No. H01-45403 has a top die (the top mold) installed on a top link side. Then, after the top die and a bottom die (the bottom mold) are brought into a closed condition by moving down the top link, a clamping force is applied via the top link between the top die and the bottom die by a crank mechanism. A die height adjusting threaded shaft and a die height adjusting threaded sleeve into which the adjusting threaded shaft is movably screwed are inserted between the top link and the top die, and an amount of screwing the adjusting threaded shaft into the adjusting threaded sleeve is changed according to a height of a die (the mold), to thereby adjust a distance between a top platen (the top mold mounting member) and a bottom platen (the bottom mold mounting member).

On the other hand, in a tire vulcanizer described in JP Kokoku (Examined Patent Publication) No. H03-70610, an upper die (the top mold) and a lower die (the bottom mold) are squeezed via a lifting table by a pressure cylinder. An extendable spacer is inserted between the lifting table and the pressure cylinder to transfer a squeezing force from the pressure cylinder to the upper die. Then, a threaded part formed on a top of the spacer is mated in a nut which is contacted with the pressure cylinder, thereby allowing a length of the spacer to be adjusted by rotating the nut. The length of the spacer is adjusted based on the height of the die (the mold).

Meanwhile, in a tire vulcanizer described in JP Kokoku (Examined Patent Publication) No. H01-24048, a top die (the top mold) and a bottom die (the bottom mold) can be opened or closed by lifting up and down an upper slide using a mechanical lifting means. A mold height adjusting device is installed between a top link and the top die, and a distance between an upper platen (the top mold mounting member) and a lower platen (the bottom mold mounting member) is adjusted in accordance with the height of a mold by the mold height adjusting device.

In any of the tire vulcanizers described in the above patent publications, however, the adjustment based on the height of the mold is conducted through the use of the mold height adjusting device, etc. installed at a location vertically extended from the mold as described above, which presents a problem in that an overall height of the tire vulcanizer is increased. There is another problem as described below. The adjustment based on the height of the mold is performed depending on the amount of screwing the adjusting threaded shaft into the adjusting threaded sleeve, an amount of rotation of the nut relative to the threaded part of the spacer, etc. as explained above, which make the adjustment difficult to achieve.

SUMMARY OF THE INVENTION

Therefore, the invention of this application, which was conceived to overcome the problems as described above, is directed to provide a tire vulcanizer in which adjustment based on a height of a mold is simplified, while allowing a reduced overall height of the tire vulcanizer.

In order to overcome the problems set forth above, a tire vulcanizer of the present invention comprises: a top mold and a bottom mold for receiving a raw tire horizontally; a top mold mounting member which retains the top mold; a bottom mold mounting member which retains the bottom mold; a guiding mechanism which guides the top mold mounting member in a vertical direction; an opening and closing mechanism which moves up and down the top mold mounting member along the vertical direction, and causes the top mold and the bottom mold to be opened and closed by up and down movement of the top mold mounting member; a locking mechanism which secures the top mold and the bottom mold in a closed condition; and a squeezing mechanism which exerts a clamping force between the top mold and the bottom mold, wherein the guiding mechanism, the locking mechanism, and the squeezing mechanism are installed separately from each other; and the locking mechanism comprises: tie rods disposed alongside the top mold, and each having a top end part fixed to the top mold mounting member and a lower end part on which a plurality of grooves are formed one above the other in the vertical direction; through holes formed in the bottom mold mounting member for allowing each of the tie rods to pass through each of the through holes; lock plates capable of engaging and disengaging, along a horizontal direction, with the groove on each tie rod having passed through each through hole, and lock plate shifting mechanisms each opening and closing the lock plates only in the horizontal direction relative to each tie rod.

According to the above-described configuration, the tie rods can be fixed to the bottom mold mounting member by engaging the lock plates, which are opened and closed only in the horizontal direction, with one of the plurality of grooves formed one above the other in the vertical direction on the lower end part of each tie rod. Therefore, even when the height of the mold is changed, a distance between the top and bottom mold mounting members can be changed only by shifting the one of the grooves engaged with the lock plates to another one based on the height of the mold, which can facilitate adjustment based on the height of the mold. In addition, because the adjustment based on the height of the mold is achieved by means of the plurality of grooves formed one above the other in the vertical direction on the lower end part of each of the tie rods which are disposed alongside the mold rather than being disposed on locations vertically extended from the mold, an overall height of the tire vulcanizer can be reduced.

Further, in the tire vulcanizer of the present invention, a vertical length of the tie rods may be defined as a length with which the lower end parts of the tie rods are located below the through holes when the top mold and the bottom mold are in the closed condition, and with which the lower end parts of the tie rods are located above the through holes when the top mold and the bottom mold are in the open condition.

According to the above-described configuration, when the top mold and the bottom mold are opened in order to load the raw tire or unload the vulcanized tire, the lower end parts of the tie rods are disengaged (separated) from the bottom mold mounting member. As a result of this, free work space can be secured between the lower end parts of the tie rods and the bottom mold mounting member alongside an opening between the top and bottom molds.

Still further, in the tire vulcanizer of the present invention, the lock plate shifting mechanisms may be fixed to an under surface of the bottom mold mounting member, and each provided with a lock plate opening and closing mechanism for opening and closing the lock plates along the horizontal direction.

According to the above-described configuration, the lock plate shifting mechanisms are fixed to the under surface of the bottom mold mounting member. Therefore, the lock plate shifting mechanisms are not able to move in the vertical direction relative to the bottom mold mounting member. In this way, even when the clamping force from the squeezing mechanism is lowered during vulcanization, because the lock plate shifting mechanisms are prevented from moving in the vertical direction relative to the bottom mold mounting member, the tie rods each engaged with the lock plates in the groove will experience almost no movement in the vertical direction. Consequently, it is possible to provide the tire vulcanizer with a high level of safety in which the mold can hardly be opened during vulcanization.

Moreover, in the tire vulcanizer of the present invention, the squeezing mechanism may comprise a gas cylinder including a piston member formed in a ring shape, and the piston member may be set to be concentric with respect to the raw tire received by the top mold and the bottom mold, and may be formed in a size with which an outer diameter of the raw tire is positioned between an outer diameter and an inner diameter of the piston member.

According to the above-described configuration, an area of receiving a pressure can be increased in the piston member, thereby allowing the use of low-pressure air or nitrogen gas as a pressure fluid. This obviates the need for high-pressure oil used as the pressure fluid, with a result that a fear of polluting a surrounding environment can be eliminated even at the occurrence of leakage of the pressure fluid.

Further, in the tire vulcanizer of the present invention, the bottom mold mounting member may comprise a lower support in which the through holes are formed, and a lower platen which is capable of vertically moving up and down relative to the lower support, and attached to the piston member to retain the bottom mold, and the gas cylinder may be a single-action cylinder for pressing the piston member upward.

According to the above configuration, when the piston member is not pressed by the gas cylinder in the closed condition of the top mold and the bottom mold, the lower platen is shifted downward by a weight of heavy components such as the top mold closed on the bottom mold, the top mold mounting member retaining the top mold, and the tie rods. Because the piston member is also moved downward (automatically returned to an initial position) by the downward shifting of the lower platen, the single-action cylinder can be used as the gas cylinder. In this way, it becomes possible to make the operation system (such as piping) of the squeezing mechanism simple as compared with that in a case of using a double-action cylinder, etc. as the gas cylinder.

Still further, in the tire vulcanizer of the present invention, number of the tie rods may be increased, and the tie rods may be arranged at an equally spaced interval around a circumference of the top mold.

According to the above configuration, a reaction force to the clamping force exerted by the squeezing mechanism is received in a shared manner by each of the tie rods, which can lead to reduction of a force received by each of the tie rods. In addition, the arrangement of the tie rods equally spaced around the circumference of the top mold can equalize the force received by each of the tie rods.

Furthermore, in the tire vulcanizer of the present invention, the opening and closing mechanism may comprise a threaded rod having a shaft center aligned with the vertical direction, a nut member screwed onto the threaded rod, and attached to the top mold mounting member, a motor for rotating the threaded rod in forward and reverse directions, and a position controlling mechanism for positioning the top mold mounting member.

According to the above configuration, the threaded rod is rotated in the forward and reverse directions using the motor, to thereby lift up and down the nut in the vertical direction, and, in turn, to lift up and down the top mold mounting member in the vertical direction. That is to say, because the top mold mounting member is lifted up and down by a rectilinear motion converted from a rotary motion of the motor whose rotation speed, rotation angle, or other features can be readily controlled, an accuracy of positioning the top mold mounting member can be improved as compared with a case where the top mold mounting member is lifted up and down using only the rectilinear motion caused by a cylinder or the like.

According to the tire vulcanizer of the present invention, the adjustment based on the height of the mold can be simplified, while reducing the overall height of the tire vulcanizer.

DESCRIPTION OF THE PREFERRED EMBODIMENT

With reference to drawings, an embodiment of a tire vulcanizer according to the present invention will be described below.

[Overall Structure of Tire Vulcanizer]

Figure 1:
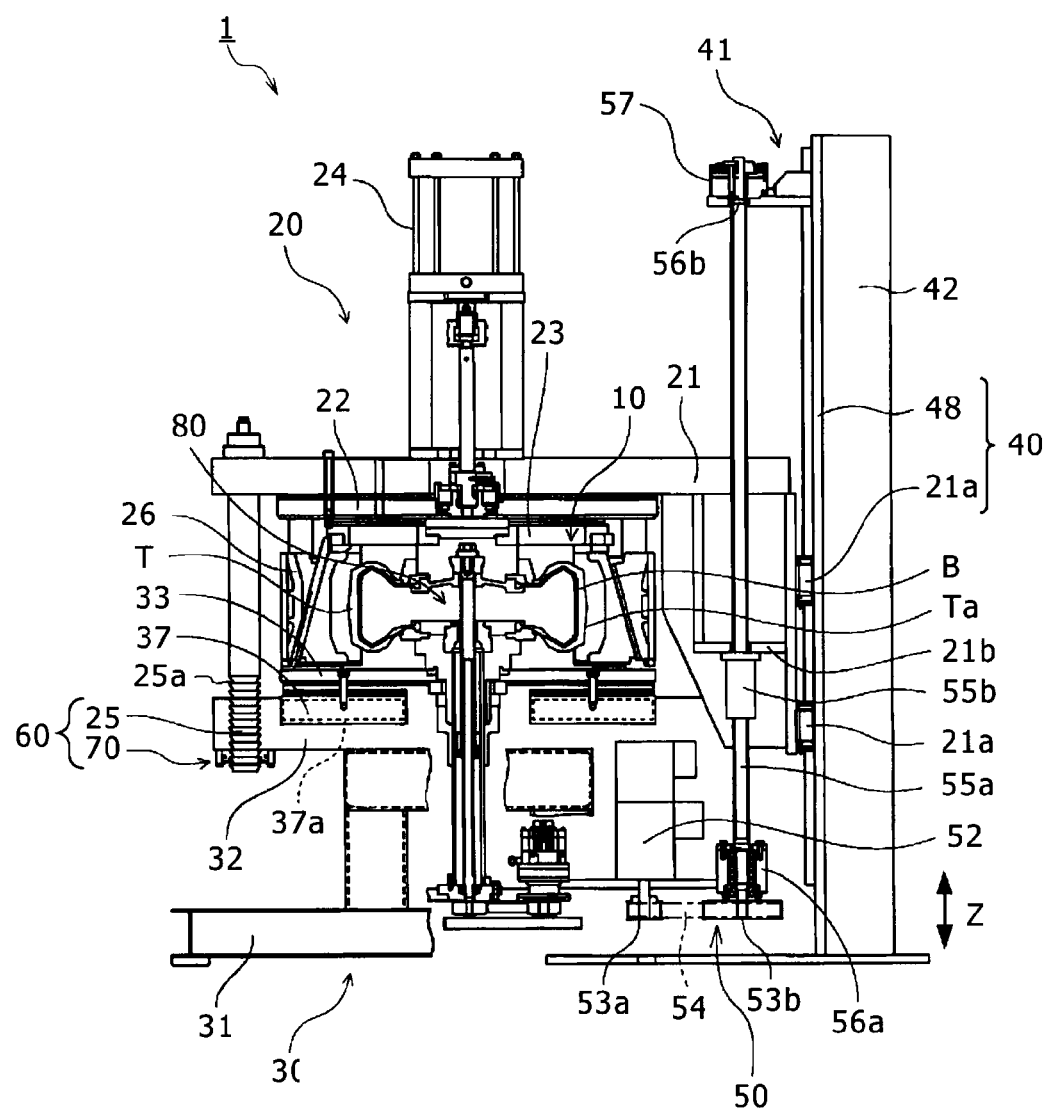
FIG. 1 is a cross-sectional view showing a closed condition of a top mold and a bottom mold in a tire vulcanizer according to one embodiment of the present invention.
Figure 2:
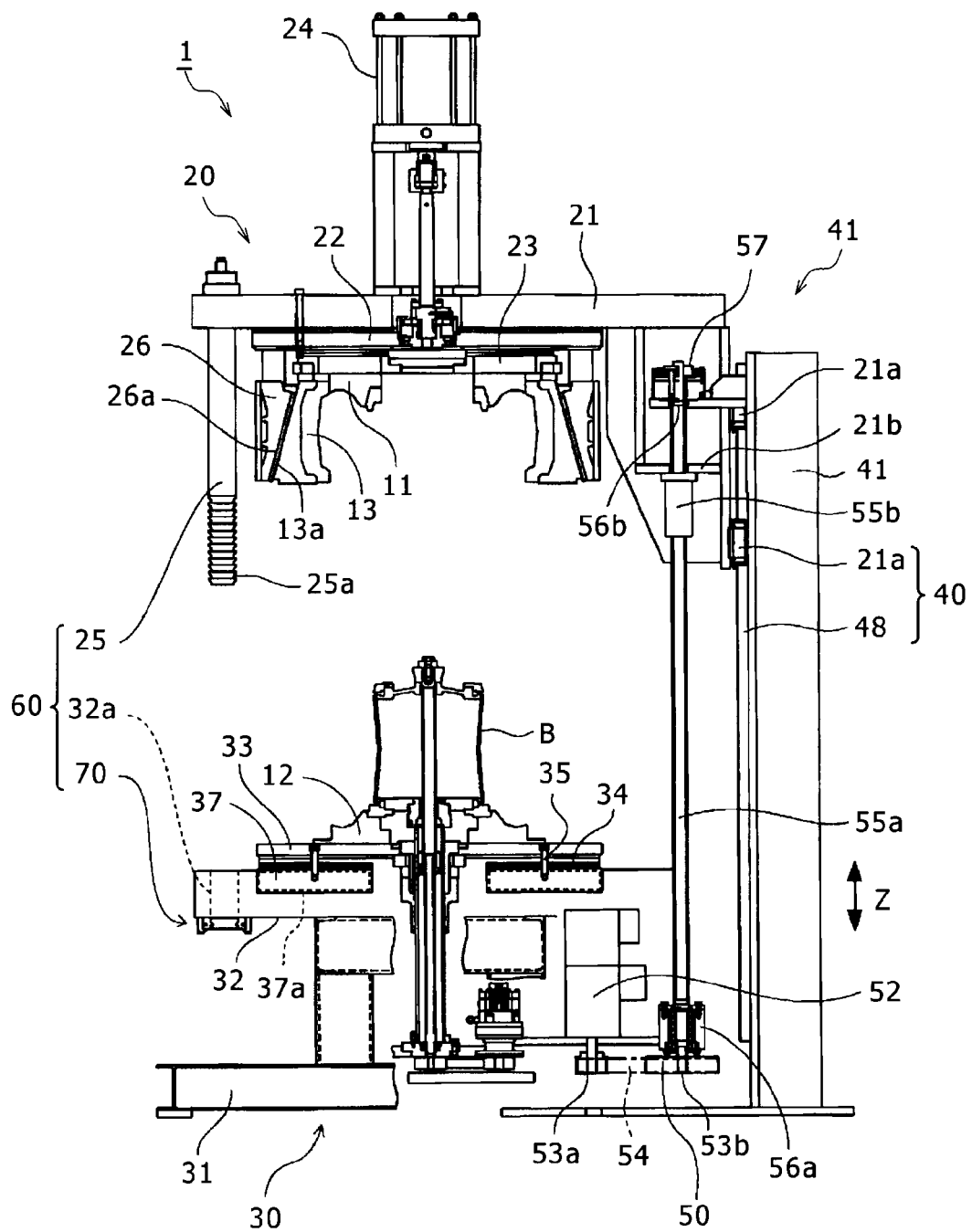
FIG. 2 is a cross-sectional view showing an open condition of the top mold and the bottom mold in the tire vulcanizer according to one embodiment of the present invention.

A tire vulcanizer 1 according to this embodiment is a press device of a type in which a raw tire T is heated from inside by a heating and pressurizing medium inserted in the raw tire T, and is also vulcanized by heating a mold 10 from outside. As shown in FIGS. 1 and 2, the tire vulcanizer 1 mainly comprises the mold 10 (including a top mold 11, a bottom mold 12, and a side mold 13) for removably receiving the raw tire T, a top mold mounting member 20 for retaining the top mold 11, a bottom mold mounting member 30 for retaining the bottom mold 12, a guiding mechanism 40 for guiding the top mold mounting member 20 along a vertical direction, an opening and closing mechanism 50 for moving up and down the top mold mounting member 20 in the vertical direction and causing the top mold 11 and bottom mold 12 to be opened or closed by the up and down movement of the top mold mounting member 20, a locking mechanism 60 for locking the top mold 11 and the bottom mold 12 in a closed condition, a gas cylinder 37 implemented as a squeezing mechanism, and a center mechanism 80 for vertically extending or retracting a bladder B to place inside the raw tire T or remove from the raw tire T. Further, in the tire vulcanizer 1, the guiding mechanism 40, the locking mechanism 60, and the squeezing mechanism (the gas cylinder 37) are installed separately from each other.

The raw tire T is received horizontally within the mold 10, and vulcanized and patterned by heat applied from both inside and outside the raw tire T. It should be noted that the heating and pressurizing medium for use in vulcanization and patterning of the raw tire T may include steam, gas (which may be an air or an inert gas such as a nitrogen gas), and the like.

[Mold]

The mold 10 used in the tire vulcanizer 1 according to this embodiment is composed of a segment which is separated into the top mold 11, the bottom mold 12, and the side mold 13. The top mold 11 is disposed above the horizontally mounted raw tire T, the bottom mold 12 is disposed below the raw tire T, and the side mold 13 is disposed around an outer circumference of the raw tire T. The side mold 13 is circumferentially divided and mated with outer circumferential regions of the top mold 11 and the bottom mold 12 when the molds are closed.

An inclined surface 13*a*, which is inclined toward a radially inner side as it approaches a top, is formed around an outer circumference of the circumferentially divided side mold 13. Further, an inclined surface 26*a* whose inclination is the same as that of the inclined surface 13*a* is formed on an inner surface of a container ring 26 disposed on a radial outside of the side mold 13. The side mold 13 is configured to be circumferentially opened or closed through the inclined surface 13*a* which is moved along the inclined surface 26*a* by raising or lowering the side mold 13.

[Top Mold Mounting Member]

The top mold mounting member 20, which retains the above-described top mold 11 and side mold 13, can be lifted up and down along the vertical direction (a Z direction) by the opening and closing mechanism 50. The top mold mounting member 20 includes an upper slide 21 constituting a base of the top mold mounting member 20, an upper platen 22 fixed to an under surface of the upper slide 21, an upper adaptor 23 for retaining the top mold 11, a cylinder 24 for shifting the upper adaptor 23 along the vertical direction (Z direction), multiple (three, in this embodiment) tie rods 25 that are components constituting a part of the locking mechanism 60 and fixed at their top ends to the upper slide 21, and a container ring 26 attached to the upper platen 22.

A side surface of the upper slide 21 is provided with guide members 21*a* of linear-motion bearings guided along the vertical direction by a guide rail 48 of an upright 41 which will be described later. Here, note that the guide rail 48 and the guide members 21*a* constitute the guiding mechanism 40 for guiding the top mold mounting member 20 along the vertical direction.

The upper slide 21 is provided with a mounting seat 21*b* adjacent to the side surface on which the guide members 21 are mounted. A nut member 55*b*, which will be described later, in the opening and closing mechanism 50 is fixed to an under surface of the mounting seat 21*b*. Further, the mounting seat 21*b* is also provided with a through hole for allowing a later-descried threaded rod 55*a* of the opening and closing mechanism 50 to pass through.

[Bottom Mold Mounting Member]

The bottom mold mounting member 30 retains the bottom mold 12 and has a central region equipped with the center mechanism 80. The bottom mold mounting member 30 includes a press base 31 constituting a base of the bottom mold mounting member 30, a lower support 32 equipped with the gas cylinder 37 of the squeezing mechanism, and a lower platen 33 which is mounted on a later-described piston member 37*a* of the gas cylinder 37 to retain the bottom mold 12. It should be noted that the lower platen 33 is secured via a heat insulation material 34 to the piston member 37*a* by means of bolts 35.

The lower support 32 is fixed to the press base 31 and provided with through holes 32*a* (refer to FIG. 2) respectively formed on locations corresponding to the above-described three tie rods 25. In addition, the lower platen 33 and the piston member 37*a* are integrated into one unit capable of moving up or down relative to the lower support 32. Further, the later-described upright 41 is attached to the press base 31.

[Squeezing Mechanism]

The squeezing mechanism is composed of the gas cylinder 37 including the piston member 37*a* of the ring shape. When the top mold 11 and the bottom mold 12 are secured in the closed condition by the locking mechanism 60, the gas cylinder 37 is supplied with a pressure fluid to pressurize the piston member 37*a* upward (elevate the piston member 37*a* from an initial position), with a result that the lower platen 33 moves up with the elevation of the piston member 37*a*. The bottom mold 12 is upwardly pushed as the lower platen 33 moves up, thereby generating via the tie rods 25 a clamping force which opposes an internal pressure of the tire which is being vulcanized between the top mold 11 and the bottom mold 12.

Figure 3:
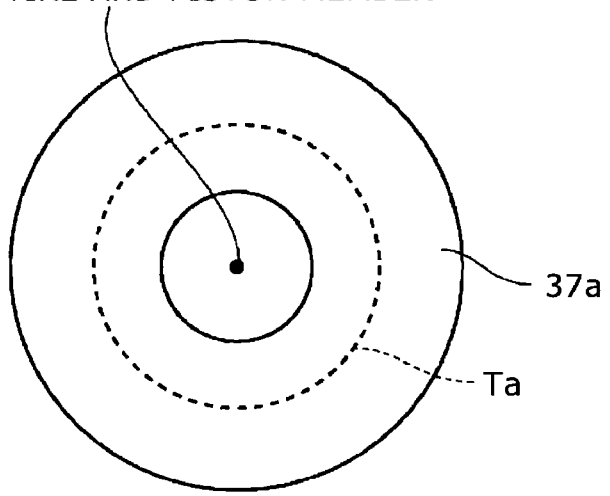
FIG. 3 is a plan view for explaining a positional relationship between a raw tire received in a mold and a piston member in a gas cylinder.

The piston member 37*a* is designed as shown in FIG. 3 and set to be concentric with the raw tire T horizontally mounted in the mold 10, and also formed in a size with which an outer diameter Ta of the raw tire T is between an outer diameter and an inner diameter of the piston member 37*a*. In this way, a pressure receiving area can be increased in the piston member 37*a*, allowing the use of low-pressure air or nitrogen gas as the pressure fluid which is supplied to the gas cylinder 37. As a result of this, it becomes unnecessary to use oil of a high pressure as the pressure fluid, which can, in turn, eliminate a fear of polluting a surrounding environment even at the occurrence of leakage of the pressure fluid.

Meanwhile, when no pressure fluid is supplied to the gas cylinder 37 in the closed condition of the top mold 11 and the bottom mold 12 secured by the locking mechanism 60, the lower platen 33 is shifted downward by a weight of heavy components, such as the top mold 11 mated with the bottom mold 12 in the closed condition, the top mold mounting member 20, and the tie rods 25. The piston member 37*a* is also moved downward (automatically returned to the initial position) by the downwardly shifting of the lower platen 33, which allows the use of a single-action cylinder for the gas cylinder 37 because what is required of the gas cylinder 37 is to be squeezed upward only. Thus, when compared to a case of using a double-action cylinder or the like as the gas cylinder 37, a control system (such as piping) of the squeezing mechanism can be simplified.

[Locking Mechanism]

The locking mechanism 60 is mainly composed of the tie rods 25, lock plate shifting mechanisms 70, and the through holes 32a formed in the lower support 32. The locking mechanism 60 is installed to secure the top mold 11 and the bottom mold 12 in the closed condition. More specifically, the locking mechanism 60 is installed to fix the top mold mounting member 20 via the tie rods 25 to the bottom mold mounting member 30, thereby locking the mold 10 in order to prevent the mold 10 from being opened during vulcanization.

On a lower end part of each tie rod 25, a plurality of grooves 25a are formed one above the other at regularly-spaced intervals in the vertical direction. In other words, vertical pitches of the grooves 25a are equal. It should be noted that, in addition to the formation with the regularly-spaced intervals, the grooves 25a may be formed at spacings corresponding to mold height, or specific grooves 25a of the plurality of grooves 25a may be formed at locations corresponding to the specific mold height. Namely, the lower end part of each tie rod 25 may be provided with any grooves 25a as long as the plurality of grooves 25a are formed one above the other in the vertical direction. Each lock plate shifting mechanism 70 is capable of engaging lock plates 73a, 73b, which will be described later, with a predetermined one of the grooves 25a of each tie rod 25 having passed through each through hole 32a, to thereby secure the upper slide 21 (the top mold mounting member 20) at a predetermined position corresponding to a height of the mold 10. Note that upward facing surfaces of the grooves 25a of each tie rod 25 and downward facing surfaces of the lock plates 73a, 73b are horizontally formed, so that their horizontal surfaces are able to receive a reaction force to the clamping force applied by the gas cylinder 37.

Figure 4:
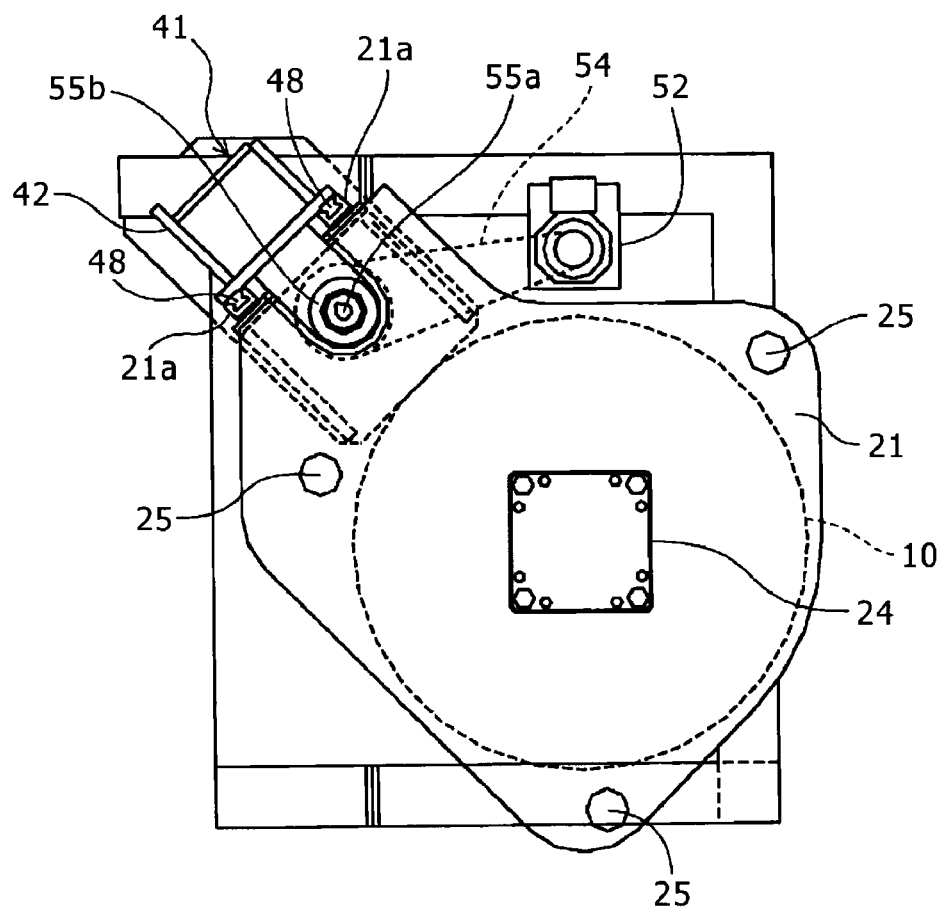
FIG. 4 is a plan view of the tire vulcanizer according to one embodiment of the present invention.

In the tire vulcanizer 1, a locking mechanism 60 with multiple (three, in this embodiment) tie rods 25 is installed. In this way, the reaction force to the clamping force applied by the gas cylinder 37 is received in a shared manner by the multiple tie rods 25, which can leads to reduction of a force received by each of the tie rods 25. Further, as shown in FIG. 4, the tie rods 25 are equally spaced around the circumference of the top mold 11 (mold 10). In other words, the tie rods 25 are disposed in such a manner that the center of gravity of a figure formed by lines connecting the tie rods 25 (a triangle when three tie rods are used) on a plan view coincides with the center of the mold 10 (a center of circle of the piston member 37a). In this way, the force received by each of the tie rods 25 is equalized. Meanwhile, it is preferable that three or more tie rods 25 are provided in terms of balanced stable fixing of the top mold mounting member 20 with respect to the bottom mold mounting member 30.

Moreover, in the present embodiment, the tire vulcanizer 1 is equipped with the mounted locking mechanism 60 and the guiding mechanism 40 which are installed separately from each other as described above. That is to say, the function of guiding the top mold mounting member 20 along the vertical direction is not provided to the tie rods 25. It is therefore unnecessary for the tie rods 25 to function as a connector between the top mold mounting member 20 and the bottom mold mounting member 30 when the top mold mounting member 20 is lifted up by the opening and closing mechanism 50, to thereby open the top mold 11 and the bottom mold 12. So, it is only necessary for the tie rods 25 to have a vertical length needed to mount the mold 10 of a possible maximum height in the tire vulcanizer 1. With this in view, in this embodiment, the vertical length of the tie rods 25 is set to a length with which the lower end parts of the tie rods 25 are located below the through holes 32a when the top mold 11 and the bottom mold 12 are in the closed condition (refer to FIG. 1), i.e. in a mold clamping state where the top mold 11 arrives at a predetermined lower end position, and with which the lower end parts of the tie rods 25 are located above the through holes 32a when the top mold 11 and the bottom mold 12 are in the open condition (refer to FIG. 2), i.e. in a mold unclamping state where the top mold 11 arrives at a position of a predetermined height. In this way, when the top mold 11 and the bottom mold 12 are opened in order to load the raw tire T and unload the vulcanized tire as shown in FIG. 2, the lower end parts of the tie rods 25 can be disengaged (separated) from the bottom mold mounting member 30. As a result, a free working space can be secured between the lower end parts of the tie rods 25 and the bottom mold mounting member 30 alongside an opening between the top and bottom molds 11, 12, which can provide increased flexibility in an installation position of a tire loading and unloading apparatus (a loader or an unloader), or improvement in workability for replacing the mold 10. That is to say, the tire loading and unloading apparatus can be readily transferred in and from between the top mold mounting member 20 and the bottom mold mounting member 30 without interference from the tie rods 25. Or, the tie rods 25 do not hinder replacement of the mold 10.

[Lock Plate Shifting Mechanisms]

The lock plate shifting mechanisms 70 are fixedly installed on an under surface of the lower support 32, and each positioned at the center of each tie rod 25 in a plan view. As shown in FIG. 5, each lock plate shifting mechanism 70 comprises side guides 71a and 71b opposed at a predetermined distance from each other, connection plates 72a and 72b for connecting ends of the side guides 71a and 71b to each other, horizontally slidable two lock plates 73a and 73b fitted in horizontal channels formed on opposing inner sides of the side guides 71a and 71b, and a cylinder 74 functioning as an opening and closing mechanism for horizontally opening and closing the lock plates 73a and 73b. The direction of travel of the lock plates 73a and 73b is limited only to a horizontal direction by the side guides 71a and 71b.

Further, because the lock plate shifting mechanisms 70 are fixedly installed on the under surface of the lower support 32 as described above, the lock plate shifting mechanisms 70 are not allowed to move in the vertical direction relative to the bottom mold mounting member 30. In this way, even when the clamping force applied by the gas cylinder 37 is lowered during vulcanization, because the lock plate shifting mechanisms 70 are prevented from moving in the vertical direction relative to the bottom mold mounting member 30, the tie rods 25 each engaged with the lock plates 73a, 73b in the groove 25a will experience almost no vertical motion. As a result, the tire vulcanizer 1 with a superior level of safety can be obtained, in which the mold 10 can hardly be opened during vulcanization.

Figure 5B:
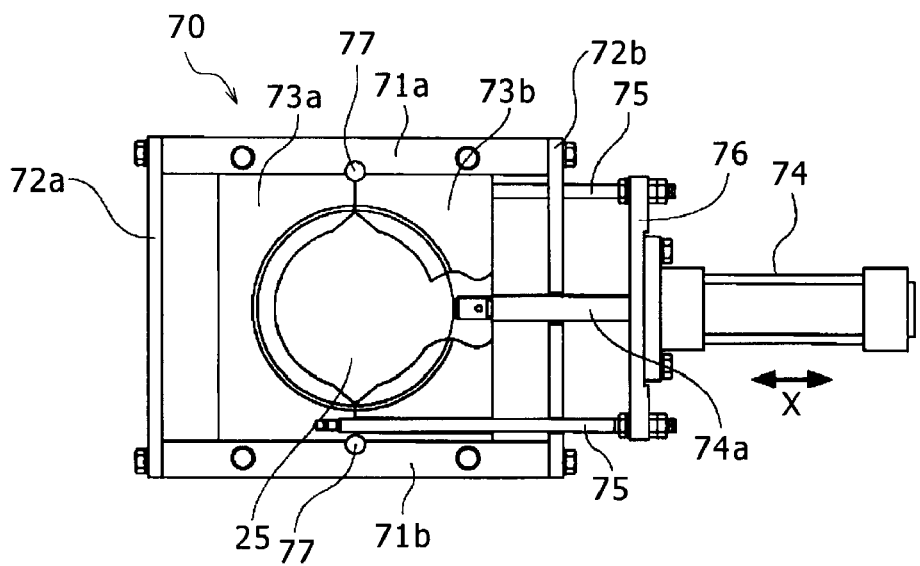
FIG. 5B is a plan view of the one of lock plate shifting mechanisms in the tire vulcanizer according to one embodiment of the present invention, showing the lock plates which are engaged with the groove of the tie rod.
Figure 6:
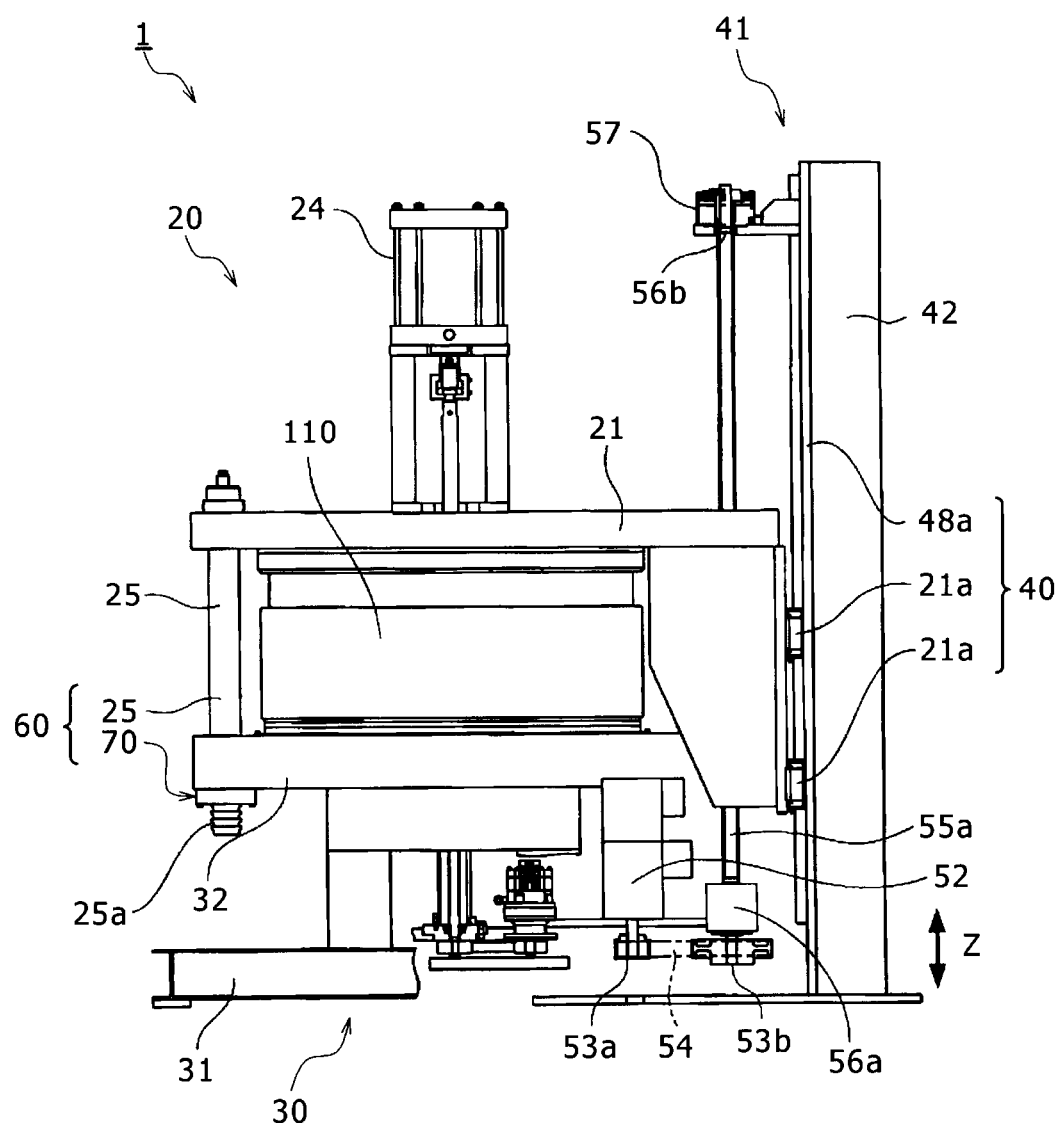
FIG. 6 is a cross sectional view of the tire vulcanizer with a mold which is lower than the mold in FIG. 1.

The lock plates 73a, 73b are plates capable of horizontally engaging and disengaging with the grooves 25a of each tie rod 25 as appropriate. Two rods 75 are jointed to the lock plate 73a on a connection plate 72a side. Then, after penetrating holes formed in the lock plate 73b on a cylinder 74 side, the rods 75 are, at nose sections thereof, joined to a cylinder mounting plate 76. The cylinder 74 is fixed to the cylinder mounting plate 76, and a cylinder rod 74a of the cylinder 74 is jointed to the lock plate 73b on the cylinder 74 side. With this configuration, a stroke of the cylinder 74 in its extending direction (an X direction) will cause the lock plates 73a and 73b to approach each other (refer to FIG. 5B). More specifically, upon physical contact of one of the lock plates with a stopper 77, the other of the lock plates start to approach the one of the lock plates remaining at rest due to the stopper 77, and then the lock plates 73a and 73b are engaged with a predetermined one of the grooves 25a of each tie rod 25. In this way, the lock plates 73a, 73b are secured at a location of the predetermined groove of each tie rod 25 corresponding to the height of the mold 10. That is, when the high (thick) mold 10 is used, the lock plates 73a, 73b will be engaged with a lower one of the grooves 25a. On the other hand, when a low (thin) mold 110 is used as shown in FIG. 6, the lock plates 73a, 73b will be engaged with an upper one of the grooves 25a. For this reason, a length of a tie rod 25 protruded from one of the lock plate shifting mechanisms 70 is, as shown in FIG. 6, longer than that shown in FIG. 1. Thus, the distance between the upper and lower platens 22, 33 (top and bottom mold mounting members 20, 30) is determined based on the location (a lock position) of one of the grooves 25a to be engaged with the lock plates 73a, 73b.

When the lock plates 73a, 73b are engaged with the lowest one of the grooves 25a, the distance between the upper and lower platens 22, 23 will be equal to the maximum height of the mold 10 which can be mounted in the tire vulcanizer 1. When the piston member 37a is pressurized after the mold 10 of the maximum height is mounted, the tie rods 25 (the top mold mounting member 20) will undergo vertical displacement by an amount equal to a sum of a vertical clearance between the lowest one of the grooves 25a and the lock plates 73a, 73b and an amount of deformation of each part (such as the mold 10) resulting from the clamping force (a raising force of the piston).

Here, a pitch of the grooves 25a is taken as P, and a value obtained by subtracting the actual height of the mold 10 which is being vulcanized from the maximum height of the mold 10 which can be vulcanized is taken as D. When D is smaller than P, the lock plates 73a, 73b will be engaged with the groove 25a at the lowest position corresponding to the maximum height of the mold 10 which can be vulcanized. When D is in between 2P and P, the lock plates 73a, 73b will be engaged with a groove 25a located one level above the groove 25a at the lowest position corresponding to the maximum height of the mold 10 which can be vulcanized. As such, the location (the lock position) of the groove 25a to be engaged with the lock plates 73a, 73b is determined based on the height of the mold 10. It should be noted that the maximum stroke of the gas cylinder 37 is larger than "P+clearance+amount of deformation". The amount of the deformation is the displacement of tie rods 25 during squeezing.

Figure 5A:
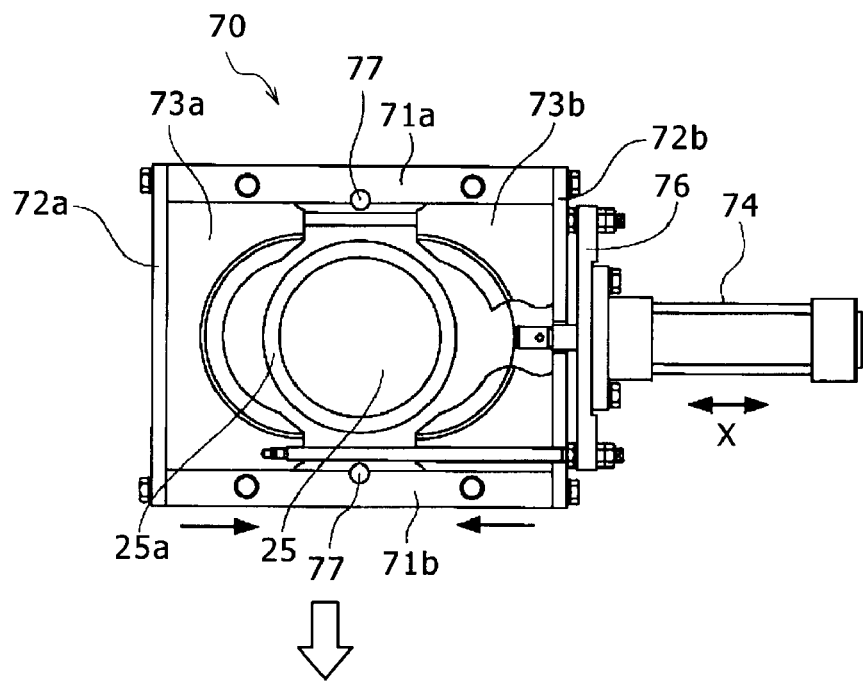
FIG. 5A is a plan view of one of lock plate shifting mechanisms in the tire vulcanizer according to one embodiment of the present invention, showing lock plates which are not engaged with a groove of a tie rod.

On the other hand, when the clamping between the top mold 11 and the bottom mold 12 is released after vulcanization is complete, the cylinder 74 is caused to travel in a retracting direction (the X direction), thereby moving the lock plates 73a and 73b away from each other to disengage the lock plates 73a, 73b from the groove 25a of each tie rod 25 (refer to FIG. 5A). In this connection, although the example of using the stopper 77 has been described here, the stopper 77 may be omitted. In this case, each tie rod 25 itself will also function as a stopper.

[Upright]

The upright 41 is installed as shown in FIGS. 1 and 2 to move the top mold mounting member 20 (the upper slide 21) along the vertical direction (the Z direction). The upright 41 is disposed outside the top mold mounting member 20 (the upper platen 22), and composed of a base section 42 extending along the vertical direction, the opening and closing mechanism 50 for lifting up and down the top mold mounting member 20 (the upper slide 21), and the guide rail 48 that is a linear-motion rail for guiding the guide members 21a along the vertical direction (the Z direction).

[Opening and Closing Mechanism]

The opening and closing mechanism 50 includes a ball screw mechanism which includes the threaded rod 55a driven by a motor 52, and converts a rotary motion of the motor 52 into a rectilinear motion for lifting the top mold mounting member 20 up and down. More specifically, the opening and closing mechanism 50 includes the motor 52 functioning as a drive source, a pulley 53a coupled to the motor 52, a pulley 53b disposed at a predetermined distance from the pulley 53a, a timing belt 54 looped over the pulleys 53a and 53b, the threaded rod 55a coupled to the pulley 53b, the nut member 55b which is screwed onto the threaded rod 55a and capable of vertically moving with the threaded rod 55a being rotated, a lower bearing 56a and an upper bearings 56b which axially and rotatably support the threaded rod 55a, and a brake 57 mounted on a top section of the threaded rod 55a. It should be noted that although a servomotor having a high stopping accuracy is used as the motor 52 in this embodiment, an inverter motor having a servo lock function may be used. Meanwhile, the brake 57 is installed to stop the top mold mounting member 20 for more than a few seconds. A top surface of the nut member 55b is fixed to an under surface of the mounting seat 21b in the upper slide 21.

When the motor 52 is driven, the pulley 53a connected to a drive shaft of the motor 52 is rotated, and the pulley 53b is accordingly rotated via the timing belt 54. As a result of this, the threaded rod 55a coupled to the pulley 53b is rotated, thereby moving the nut member 55b along an axial direction of the threaded rod 55a (the vertical direction, or the Z direction). As the nut member 55b is thus moved along the vertical direction (the Z direction), the upper slide 21 having the mounting seat 21b fixed to the nut member 55b is moved with the nut member 55b along the vertical direction (the Z direction). At this time, a moving direction of the upper slide 21 is limited only to the vertical direction (the Z direction) by the guiding mechanism 40 (the guide members 21a, the guide rail 48).

In addition, the opening and closing mechanism 50 comprises an encoder (not illustrated) attached to a rotating shaft of the threaded rod 55a to detect information on an angle of rotation or the like, and a position controlling mechanism (not illustrated) for controlling the motor 52 based on the information detected by the encoder and positioning the top mold mounting member 20 in the vertical direction. Because the position controlling mechanism controls the motor 52 based on the information detected by the encoder, the top mold mounting member 20 can be positioned with high accuracy, which in turn allows alignment of vertical positions between the groove 25a of each tie rod 25 engaged with the lock plates 73a, 73b (the lock position) and the lock plates 73a, 73b. Further, because the top mold mounting member 20 is lifted up and down by the rectilinear motion converted from the rotary motion of the motor 52 whose rotation speed, rotation angle, or other features can be readily controlled as described above, it is possible to achieve a higher positioning accuracy of the top mold mounting member 20 than that achieved when the top mold mounting member 20 is lifted up and down using a rectilinear motion obtained by only a cylinder or the like.

—Operation of Tire Vulcanizer—

Next, vulcanizing operation of the tire vulcanizer 1 will be described. Firstly, in a state where the top mold 11 and the bottom mold 12 are opened as shown in FIG. 2, i.e. in the mold opening condition where the top mold 11 has reached a predetermined height, the top mold mounting member 20 is lifted up. In this state, the raw tire T is loaded in the tire vulcanizer 1 by the tire loading and unloading apparatus (not illustrated), and the bladder B is inserted into the inside of the raw tire T. Note that, in the above-described state, since the lower end parts of the tie rods 25 are disengaged (completely separated) from the bottom mold mounting member 30, the tie rods 25 can hardly interfere with the transport performed by the tire loading and unloading apparatus, and does not hinder replacement of the mold 10.

From that state, the top mold mounting member 20 is lifted down by the opening and closing mechanism 50 for causing the lower end parts of the tie rods 25 to pass through the corresponding through holes 32a. Then, as shown in FIG. 1, the top mold 11 and the bottom mold 12 are brought into the closed condition by positioning the top mold mounting member 20 in such a manner that the vertical positions of the lock plates 73a, 73b are vertically aligned with the location (the lock position) of the groove 25a which is to be engaged with the lock plates 73a, 73b, and accordingly stopping the top mold mounting member 20. Note that the location (lock position) of the groove 25a to be engaged with the lock plates 73a, 73b is determined based on the height of the mold 10 or the like as described above.

After that, the top mold 11 and the bottom mold 12 are secured in the closed condition by horizontally moving the lock plates 73a, 73b using the lock plate shifting mechanisms 70 so as to be engaged with the groove 25a. It should be noted that, in this condition, the lower platen 33 is shifted downward by the weight of the heavy components, such as the top mold 11, the top mold mounting member 20, and the tie rods 25, while the piston member 37a of the gas cylinder 37 is also moved downward (to the initial position) by the downward shifting of the lower platen 33.

Then, the piston member 37a is raised from the initial position by supplying the pressure fluid into the gas cylinder 37, to push the bottom mold 12 upward and accordingly generate the clamping force between the top mold 11 and the bottom mold 12. After the clamping force is generated between the top mold 11 and the bottom mold 12, the inside of the raw tire T is heated via the bladder B by the heating and pressurizing medium of the high temperature.

When vulcanization is complete, in addition to discharging the heating and pressurizing medium retained in the vulcanized tire, the pressure fluid supply to the gas cylinder 37 is shut off. Then, after disengaging the lock plates 73a, 73b of the lock plate shifting mechanisms 70 from the groove 25a of each tie rod 25, the top mold mounting member 20 is lifted up by the opening and closing mechanism 50 until the top mold mounting member 20 is raised to the mold opening position where the lower end parts are located higher than the bladder B (refer to FIG. 2). Thereafter, the bladder B is withdrawn from the vulcanized tire, and the vulcanized tire is subsequently carried out of the tire vulcanizer 1 by the tire loading and unloading apparatus, to complete a sequence of vulcanization operation.

As has been described according to this embodiment, the tie rods 25 can be fixed to the bottom mold mounting member 30 by engaging the lock plates 73a, 73b opened and closed only in the horizontal direction with one of the plurality of grooves 25a formed one above the other in the vertical direction on the lower end part of each tie rod 25. Accordingly, even when the height of the mold 10 is changed, the distance between the top and bottom mold mounting members 20, 30 can be adjusted by only shifting the one of the grooves 25a to be engaged with the lock plates 73a, 73b to another one based on the height of the mold 10. So, the adjustment based on the height of the mold 10 can be easily conducted. Further, because the adjustment based on the height of the mold 10 is conducted by means of the plurality of grooves 25a formed one above the other in the vertical direction on the lower end part of each of the tie rods 25 which are disposed alongside the mold 10 rather than being disposed on the location vertically extended from the mold 10, the overall height of the tire vulcanizer 1 can be reduced.

Further, according to this embodiment, when the top mold 11 and the bottom mold 12 are opened to load the raw tire T and unload the vulcanized tire, the lower end parts of the tie rods 25 are disengaged from the bottom mold mounting member 30. As a result of this, the free working space can be secured between the lower end parts of the tie rods 25 and the bottom mold mounting member 30 alongside the opening between the top and bottom molds 11, 12.

Still further, according to this embodiment, the lock plate shifting mechanisms 70 are fixed to the under surface of the bottom mold mounting member 30. Therefore, the lock plates 73a, 73b capable of engaging and disengaging as appropriate with the groove 25a of each tie rod 25 is not able to move in the vertical direction relative to the bottom mold mounting member 30. In this way, even when the clamping force applied by the squeezing mechanism is lowered during vulcanization, because the lock plate shifting mechanisms 70 are prevented from vertically moving relative to the bottom mold mounting member 30, the tie rods 25 each engaged with the lock plates 73a, 73b in the groove 25a will experience almost no movement in the vertical direction. Consequently, it is possible to provide the tire vulcanizer 1 with a superior level of safety, in which the mold 10 can hardly be opened during vulcanization.

Moreover, according to this embodiment, low-pressure air or nitrogen gas may be used for the pressure fluid because of the increased pressure receiving area of the piston member 37a. This obviates the need for the high-pressure oil used as the pressure fluid, with a result that the fear of polluting a surrounding environment can be eliminated even at the occurrence of leakage of the pressure fluid.

In addition, according to this embodiment, when no pressure is applied to the piston member 37a by the gas cylinder 37 in the closed condition of the top mold mounting member 20 and the bottom mold mounting member 30, the lower platen 33 is shifted downward due to the weight of heavy components, such as the top mold 11, the top mold mounting member 20, and the tie rods 25. Because the piston member 37a is also shifted downward (automatically returned to the initial position) as the lower platen 33 is shifted downward, the single-action cylinder may be used as the gas cylinder 37. In this way, the operational system (such as piping) of the squeezing mechanism can be simplified as compared with that in a case of using a double-action cylinder or the like as the gas cylinder 37.

Further, according to the present embodiment, the reaction force to the clamping force exerted by the gas cylinder 37 is received in a shared manner by the multiple tie rods 25, which can lead to reduction of the force received by each of the tie rods 25. Meanwhile, because the tie rods 25 are disposed at the equally spaced intervals around the circumference of the top mold 11, the force received by each of the tie rods 25 can be equalized.

Still further, according to the present embodiment, the threaded rod 55a is rotated in forward and reverse directions by the motor 52 to lift up and down the nut member 55b along a vertical direction, and in turn to move up and down the top mold mounting member 20 along the vertical direction. In other words, the up and down movement of the top mold mounting member 20 is caused by the rectilinear motion converted from the rotary motion of the motor 52. That is to say, because the top mold mounting member 20 is moved up and down by the rectilinear motion converted from the rotary motion of the motor 52 whose rotation speed, rotation angle, or other features can be readily controlled, a degree of accuracy of positioning the top mold mounting member 20 can be improved as compared with the case where the top mold mounting member 20 is moved up and down only using the rectilinear motion obtained by a cylinder or others.

Although the embodiment of the present invention has been described above with reference to the drawings, it is not intended to limit the invention to specific forms of the disclosed embodiment. The scope of the present invention is defined by appended claims rather than by foregoing description of the embodiment, and all changes that fall within the meaning and range of equivalency of the claims are to be embraced within its scope.

What is claimed is:

1. A tire vulcanizer comprising:
    a top mold, a side mold movable with the top mold, and a bottom mold, for receiving a raw tire horizontally;
    a top mold mounting member which retains said top mold;
    a bottom mold mounting member which retains said bottom mold;
    a guiding mechanism which guides said top mold mounting member in a vertical direction;
    an opening and closing mechanism which moves up and down said top mold mounting member along the vertical direction, and causes said top mold and said bottom mold to be opened and closed by up and down movement of said top mold mounting member;
    a locking mechanism which secures said top mold and said bottom mold in a closed condition; and
    a squeezing mechanism which exerts a clamping force between said top mold and said bottom mold, wherein
    said guiding mechanism, said locking mechanism, and said squeezing mechanism are installed separately from each other; and
    said locking mechanism comprises:
        tie rods disposed alongside said top mold, and each having a top end part fixed to said top mold mounting member and a lower end part on which a plurality of grooves are formed one above the other in the vertical direction;
        through holes formed in said bottom mold mounting member for allowing each of said tie rods to pass through each of said through holes;
        lock plates capable of engaging and disengaging, along a horizontal direction, with any one of said grooves on each tie rod having passed through each through hole, and
        lock plate shifting mechanisms each opening and closing said lock plates only in the horizontal direction relative to each tie rod,
    wherein said squeezing mechanism comprises a gas cylinder including a piston member formed in a ring shape, and said piston member is set to be concentric with respect to the raw tire received by said top mold and said bottom mold, and formed in a size with which an outer diameter of the raw tire is positioned between an outer diameter and an inner diameter of said piston member, and
    wherein, when said top mold and said bottom mold are in the open condition, an uppermost one of said plurality of grooves is located below a lowermost end of the top mold and the side mold, and a lowermost one of said plurality of grooves is located above an uppermost end of the bottom mold.

2. The tire vulcanizer according to claim 1, wherein:
    said lock plate shifting mechanisms are fixed to an under surface of said bottom mold mounting member, and each provided with a lock plate opening and closing mechanism for opening and closing said lock plates along the horizontal direction.

3. The tire vulcanizer according to claim 1, wherein:
    said bottom mold mounting member comprises
    a lower support in which said through holes are formed, and
    a lower platen which is capable of vertically moving up and down relative to said lower support, and attached to said piston member to retain said bottom mold, and
    said gas cylinder is a single-action cylinder for pressing said piston member upward.

4. The tire vulcanizer according to claim 1, wherein:
    said tie rods are arranged at an equally spaced interval around a circumference of said top mold.

5. The tire vulcanizer according to claim 1, wherein:
    said opening and closing mechanism comprises
    a threaded rod having a shaft center aligned with the vertical direction,
    a nut member screwed onto said threaded rod, and attached to said top mold mounting member,
    a motor for rotating said threaded rod in forward and reverse directions, and
    a position controlling mechanism for positioning said top mold mounting member.

* * * * *